United States Patent [19]
Burson et al.

[11] Patent Number: 5,550,895
[45] Date of Patent: Aug. 27, 1996

[54] BIMODAL PORTABLE TELEPHONE

[75] Inventors: Kyle L. Burson, Somerset; Yum C. Chang, Belford; Wilson Fok, Aberdeen; Kenneth W. Leland, Toms River; Denis P. Orlando, Freehold; Andrzej Partyka, Bedford, all of N.J.

[73] Assignee: Lucent Technologies Inc., Murray Hill, N.J.

[21] Appl. No.: 160,135

[22] Filed: Dec. 2, 1993

[51] Int. Cl.$^6$ .................................................. H04M 11/00
[52] U.S. Cl. ............................ 379/59; 379/58; 379/61; 455/33.1; 455/56.1
[58] Field of Search ........................ 379/58, 59, 61; 375/1, 202; 455/33.1, 33.4, 34.2, 56.1, 168.1, 166.1, 166.2

[56] References Cited

U.S. PATENT DOCUMENTS

| | | | |
|---|---|---|---|
| 4,989,230 | 1/1991 | Gillig et al. | 379/59 |
| 5,115,463 | 5/1992 | Moldavsky et al. | 379/58 |
| 5,119,397 | 6/1992 | Dahlin et al. | 379/59 |
| 5,291,516 | 3/1994 | Dixon et al. | 375/1 |
| 5,442,680 | 7/1995 | Schellinger et al. | 379/58 |

Primary Examiner—Ewdard L. Coles, Sr
Assistant Examiner—Thomas L. Stoll
Attorney, Agent, or Firm—Samuel R. Williamson

[57] ABSTRACT

A bimodal portable telephone provides cellular service and improved cordless service in a common handset. Operation of the bimodal portable telephone in a cellular telephone system provides telephone service over a wide geographical area of coverage through operation with multiple cellular bases and in a cordless telephone system provides telephone service over a localized geographical area of coverage through operation with an associated cordless base. The cordless service provides improved performance over convention cordless telephone service by advantageously employing a frequency hopping spread spectrum modulation technique for communications between the portable telephone and the cordless base unit. This improved performance achieves increased operating range of the cordless telephone system. This increased operating range is particular advantageous to the user of the portable telephone in that it permits this more economical system to be used over a much greater distance than is possible with convention cordless telephone service. Also commonality of circuitry within the portable telephone is facilitied through the selection of operating frequencies for the cordless telephone system to be in close proximity with those of the cellular telephone system.

30 Claims, 6 Drawing Sheets

BIMODAL PORTABLE TELEPHONE

BACKGROUND OF THE INVENTION

1. Technical Field

This invention relates to portable telephones arranged for operation in wireless communication systems and more particular to a portable telephone arranged for operation in dissimilar wireless communication systems.

2. Description of the Prior Art

Portable telephones are used in a variety of wireless communication systems. These communication systems include cellular radio systems and present-day cordless telephone systems which are growing in popularity; both having achieved broad customer acceptance. Both of these systems have different protocol interface requirements, however.

Various types of cellular radio systems have been described which provide radio telephone service to a large number of mobile subscribers using a relatively small number of frequencies. Such service is provided by dividing the service area into a number of cells and reusing the frequencies in non-adjacent cells. Once such system is described in *The Bell Systems Technical Journal*, Volume 58, January 1979, Number 1, particularly in papers entitled "Advanced Mobile Phone Service: Introduction, Background and Objectives" by W. R. Young and "The Cellular Concept" by V. H. MacDonald.

Although a cellular radio system is capable of satisfactorily providing telephone service to portable telephones over a wide area, a portable telephone operating in such system has to perform a number of complex procedures. These include registering with the closest cellular base station and communicating with this base station which, in turn, is arranged to receive, set-up or hand-off a telephone call. The base station equipment also has to perform a number of complex procedures for carrying out these functions in the cellular radio system. Thus telephone service in a cellular radio system is complex and, for the present, expensive.

Cordless radio systems have been available in the an for some time. One such system was first described in, for example, *Telephony*, Jul. 22, 1967, pages 38, 54 and 55, in an article entitled "Bell Labs is Developing New Lineless Telephone". In this article, the lineless telephone is described as performing the major functions or a regular telephone set, to wit, the unit connects with the telephone network via a radio link to a fixed station. This fixed station, in turn, is connected to a telephone line or extension line. This lineless telephone also provides simultaneous two-way conversation, as well as supervision (connecting and disconnection), dialing and ringing.

Present-day cordless telephone arrangements, such as is described in U.S. Pat. No. 4,706,274 which issued to William Baker et at. on Nov. 10, 1987 and U.S. Pat. No. 5,044,010 which issued to Richard Frenkiel et al. on Aug. 27, 1991, have evolved from this basic wireless telephone system. These cordless telephones provide cordless telephone service to the network in a less complex manner than the cellular telephones provide cellular telephone service. Also, because of the simpler circuitry employed in cordless telephone arrangements, cordless telephone service is considerably more economical to date than cellular radio service. The presently available cordless telephones, however, are not capable of providing communications over a range that extends much beyond one's residence or office where an associated base for the cordless telephone is located. Also, there are only ten presently allocated communication channels (25 channels have been proposed) in the 46–49 MHz range in the United States, for example, over which this type cordless telephone may operate. Thus, not only is there a limitation of insufficient operating range, there is also the potential problem of locating an available or free channel with these telephones as they continue to increase in popularity. Moreover, voice privacy also suffers in that others may move to and monitor a channel occupied by a user of this type of cordless telephone.

In an effort to obtain the beneficial aspects of both cordless and cellular service, one arrangement described in U.S. Pat. No. 4,989,230 provides a cellular-cordless telephone in which a cellular transceiver and a cordless transceiver are combined in a single housing. Although this arrangement provides for improved wireless service by using both cordless and cellular transceivers, the cordless transceiver of this arrangement has the above described limitations of insufficient operating range, limited channel availability and lack of user privacy.

SUMMARY OF THE INVENTION

In accordance with the invention, a bimodal portable telephone provides wide area cellular service and improved cordless or neighborhood area service in a common handset. Operation of the bimodal portable telephone in a cellular telephone system provides telephone service over a wide geographical area of coverage by communicating through multiple cellular bases and in a cordless telephone system provides telephone service over a localized geographical area of coverage by communicating through an associated cordless base.

In accordance with one aspect of the disclosure, the cordless service provides improved performance over conventional cordless telephone service by advantageously employing a frequency hopping, spread spectrum modulation technique for communications between the portable telephone and its associated cordless base. This improved performance achieves, by way of example, increased operating range, voice privacy, interference avoidance and improved operation in signal-hostile environments such as are present in large buildings. The increased operating range of the cordless telephone system is particularly advantageous to the user of the portable telephone in that it permits this more economical system to be used over a much larger geographical range than is possible with convention cordless telephone service.

In accordance with another aspect of the disclosure, The architecture of the bimodal portable telephone is arranged to be optimally efficient by advantageously selecting operating frequencies for the cordless telephone system to be in close proximity with those of the cellular telephone system. Commonality of circuitry within the portable telephone is thereby facilitied.

DETAILED DESCRIPTION

An arrangement of wireless communication systems may involve a variety of individual protocol interfaces having differing operating frequencies and characteristics. A public telephone network 101 and other system components which support the respectively different protocol interfaces is diagrammatically shown in FIG. 1. The public telephone network 101 is shown connected, via a trunk 102, to a mobile switching center (MSC) 103 which serves as the control center for a cellular telephone system. The MSC 103 is connected to a base station (BS) 104, via a trunk 105. BS 104 includes the necessary control and radio transmission and reception equipment to provide supervisory, control and communication channels to a plurality of portable telephone handsets 107 typically served in the coverage area of the base station. In this scenario, the portable handset may be used to communicate with the public land telephone network 101 through the cellular telephone network.

Figure 1:
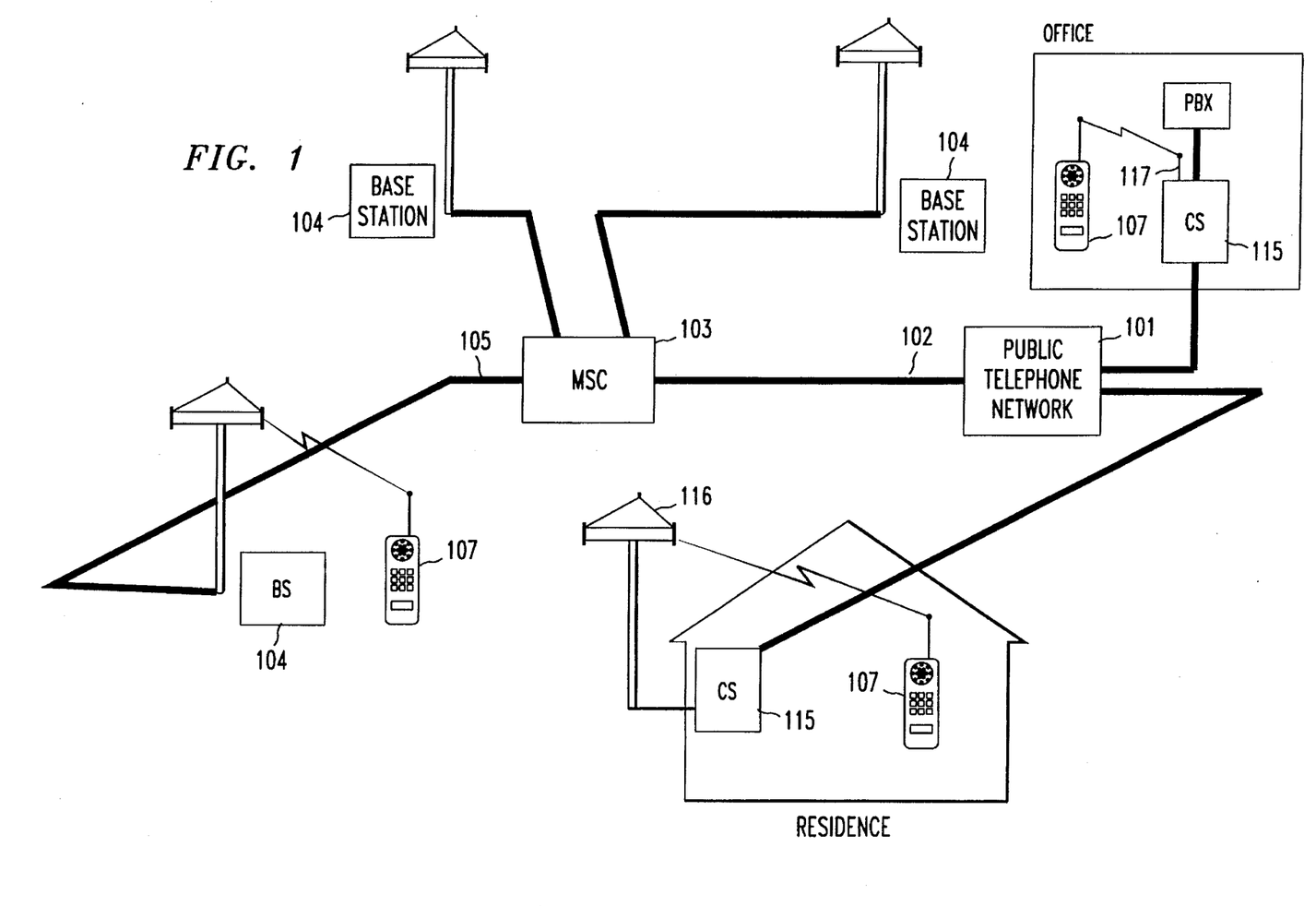
FIG. 1 is a schematic of a wireless telephone system having two distinct protocol interface systems covering a wide area and a local area respectively.
Figure 4:
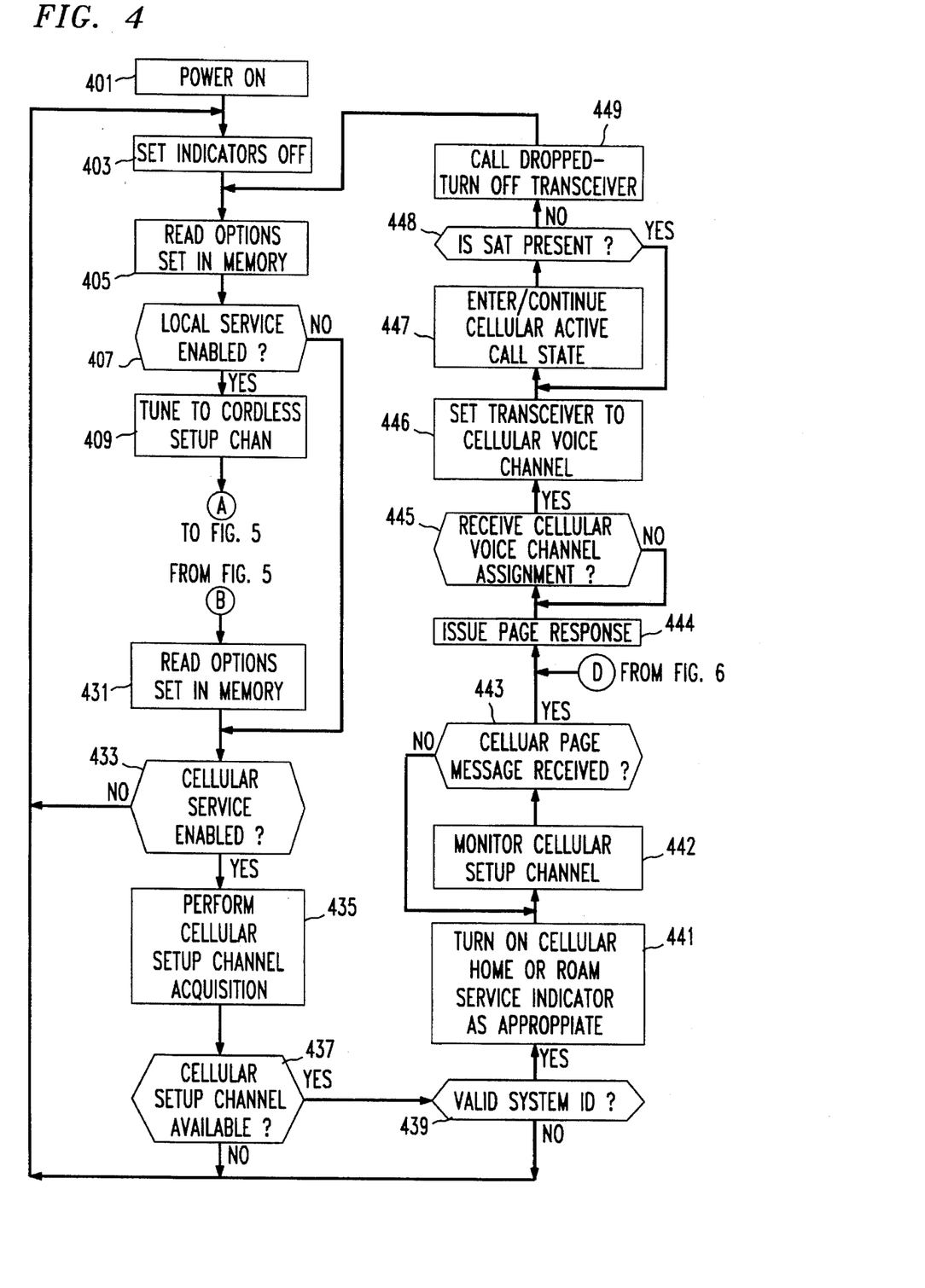
FIGS. 4 through 6 depict flow diagrams detailing operations of the portable telephone handset of FIG. 3.

The public telephone network 101 is also connected to a cordless telephone base station (CS) 115 located at a residence or, alternatively, connected to a PBX or key system included in a business or office structure. A portable telephone handset 107 also is used to communicate with the public telephone network 101 via the CS 115. The two handsets 107 shown in FIG. 1 are, in accordance with the disclosure, identical instruments capable of operating in both cellular and cordless radiotelephone service areas. The mode of operation is determined by interactions of the handset 107 with either the BS 104 or the CS 115, with the supervisory and control channel interactions as shown in FIG. 4 though 6.

The wide serving area of a cellular serving BS 104 generally covers a geographical range of several miles. The area for such geographical range is selected in accordance with the expected cellular user traffic. The local area coverage of present day cordless telephones is normally 1000 feet or less.

Typically, the cellular system uses frequencies in the 800–900 MHz frequency band range (i.e. a FCC licensed frequency range), while cordless systems typically operate at a frequencies close to or within the 46 MHz to 49 MHz frequency range (i.e. an unlicensed frequency range). The wide difference between these frequencies is an inhibiting factor in enabling a single radiotelephone handset to function efficiently in both cellular and cordless coverage areas. Thus, the typical dedicated radio telephone handset of the prior art is operative in one of the illustrative serving areas and incompatible with and inoperative in the other one of the serving areas. Even when operation in both areas is provided in a single radiotelephone handset, as described in U.S. Pat. No. 4,989,230, the range of operation in the cordless coverage range is limited to 1000 feet or less. Also commonality of circuitry within this type of radiotelephone handset is limited to only a few components. U.S. Pat. No. 5,406,615 filed in the name of R. R. Miller et al. on Aug. 4, 1993, is directed to a wireless radio telephone system which addresses in a different manner the same problems we have addressed in our invention. This U.S. Pat. No. 5,406,615 is herein incorporated by reference.

In accordance with an embodiment of the invention, a single handset designed to be operative in a spread spectrum, frequency hopping telephone system and a cellular telephone system is provided.

A general overview of spread spectrum technology including frequency hopping systems is provided by R. C. Dixon, *Spread Spectrum Systems*, New York: John Wiley & Sons, 1984, by U.S. Pat. No. 4,479,226 issued to V. K. Prabhu et al. on Oct. 23, 1984, U.S. Pat. No. 4,850,036 issued to J. W. Smith on Jul. 18, 1989 and U.S. Pat. No. 5,353,341 filed in the name of M. E. Gillis et al. on Oct. 21, 1991, these patents and the application being incorporated herein by reference. The specific requirements for the frequency hopping system in which this portable telephone handset is designed to operate are set forth in a Report and Order in General Docket No. 89-354, this Report and Order being adopted by the Federal Communications Commission on Jun. 14, 1990 and released on Jul. 9, 1990.

The line of sight range of the CS 115 is typically 6 miles when communicating with the handset 107 through a roof mounted antenna, illustratively shown as antenna 116 and is between 1 to 2 miles when communicating with the handset 107 through an antenna, illustratively shown as antenna 117, connected directly to the CS 115. Thus the benefit of having the more economical cordless telephone service is provided to a user over a much greater geographical range. Also, the selection of frequencies for the cordless system such that they are in close proximity with those of the cellular telephone system facilitates the use of common circuitry within the single portable telephone handset operative in both cellular and cordless protocol interfaces.

Figure 2:
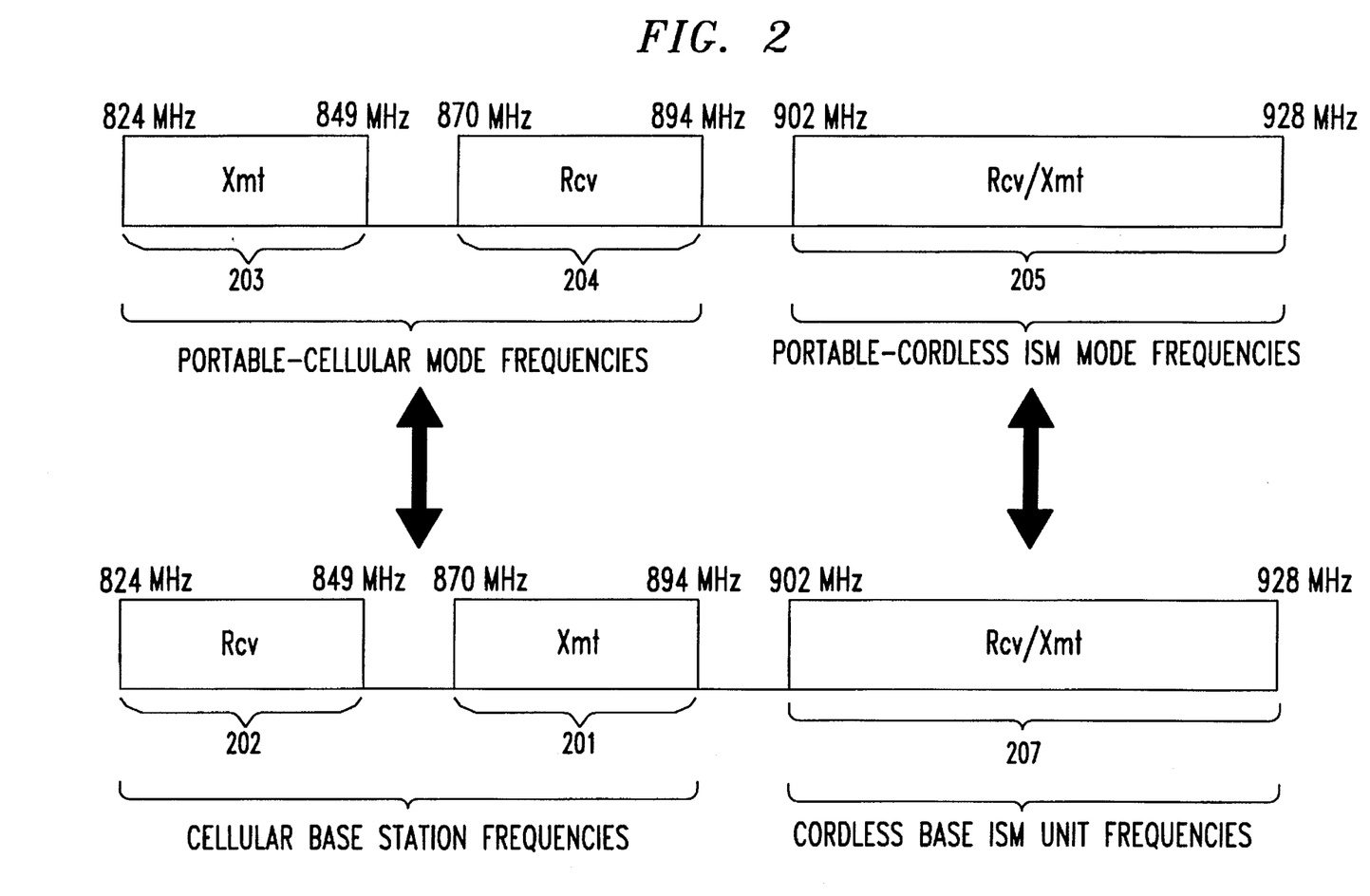
FIG. 2 is a graph of representative frequency spectra which may support the differing protocol interfaces of the wide and local area.

Suitable illustrative frequency ranges for optimal use with the bimodal portable handset, diagrammatically shown in FIG. 3 and described in detail later herein, are shown in the frequency graph of FIG. 2. This bimodal portable handset is operative in both the frequency hopping system and the cellular radio system. As shown in the graph a typical cellular base station may transmit at a band of frequencies 201 encompassing a range of 870 MHz to 894 MHz and receive communication signals within a band of frequencies 202 from 824 MHz to 849 MHz. The bimodal portable handset while operating in a cellular mode may transmit in the frequency band 203 of 824 MHz to 849 MHz. Its receiving band of frequencies 204 in the cellular mode is 870 MHz to 894 MHz.

The cordless frequency bands of operation are selected in a frequency band just above the cellular band of frequencies and different from the present frequency band used by cordless telephone systems. This higher frequency band is one selected from what is designated by the FCC as the Industrial, Scientific and Medical (ISM) frequency bands.

The illustrative bimodal portable handset is operative to receive and transmit cordless radiotelephone signals in a frequency band 205 of between 902 MHz and 928 MHz. This frequency band is within the provisions for spread-spectrum frequency hopping use as permitted by the Federal Communication Commission (FCC). And the cordless base station unit is operative to transmit and receive signals in a frequency band 207 of between 902 MHz to 928 MHz.

Figure 3:
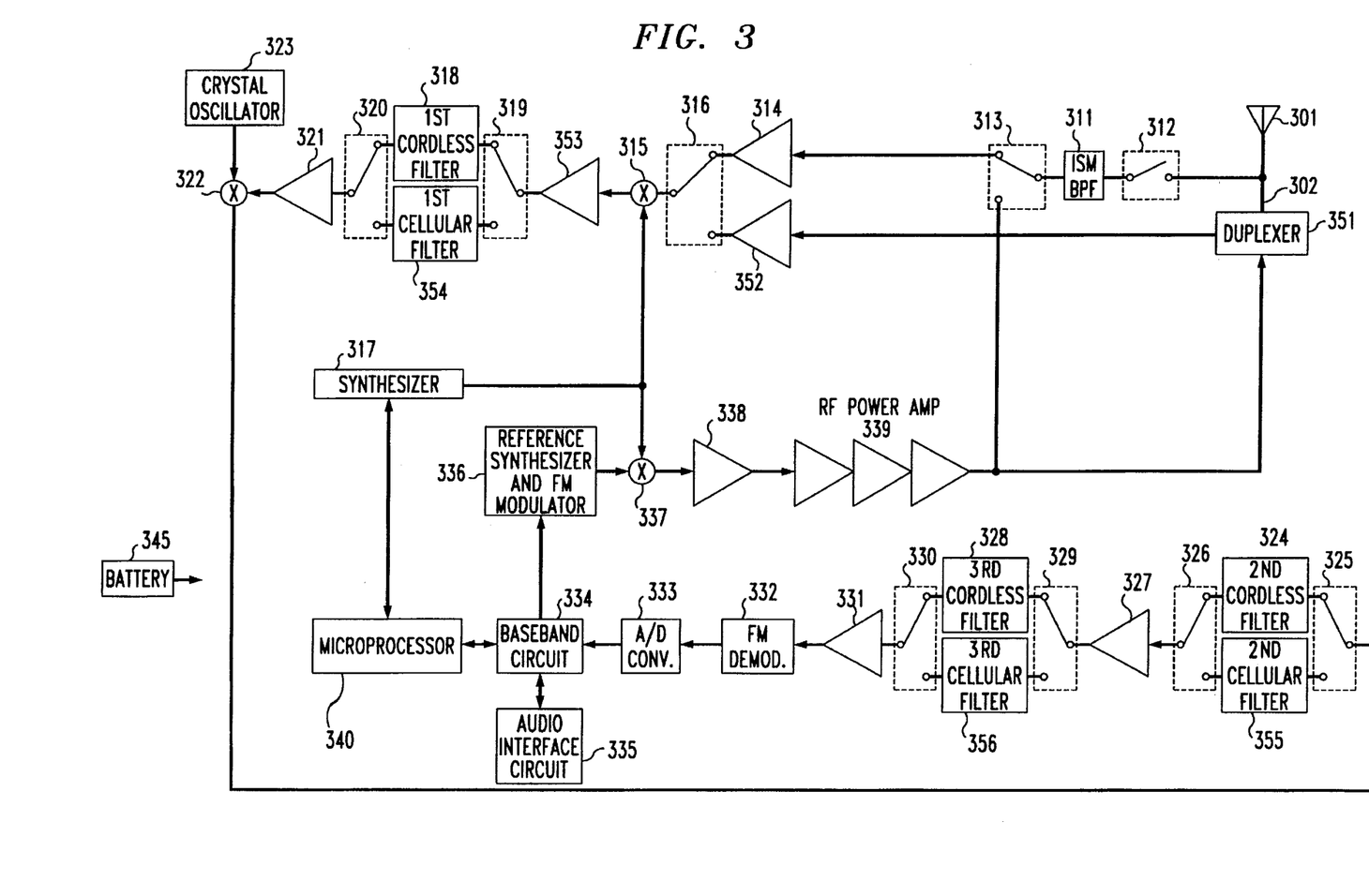
FIG. 3 is a schematic of a portable telephone handset operative in both protocol interfaces in the wireless radio-telephone systems depicted in FIGS. 1 and 2.

A bimodal portable handset, constructed to efficiently utilize the above described plurality of radio frequency band spectra in both cellular and cordless systems, is shown in block schematic form in FIG. 3.

In the operation of the bimodal portable handset, a radio-frequency (RF) received signal is received over a single antenna 301. This received signal, depending upon the selected configuration of the handset, i.e., as a cordless telephone or a cellular telephone, is routed differently. The received signal is muted to a duplexer 351 over line 302 when the handset is configured as a cellular handset and to a ISM band pass filter 311 via a pin-diode switch 312 when the handset is configured as a cordless telephone. The configuring of the handset and the routing of signals in this handset are further described in detail herein below. Power for the operation of each of the components in the handset is provided by a battery 345.

First, with reference to signal reception operation of the bimodal handset while this handset is configured in the cordless telephone mode, the signal from the bandpass filter 311 is coupled to a pin-diode switch 313 and then to a low noise amplifier 314. From the low-noise amplifier 314, the cordless receive signal is coupled to a mixer 315 via a pin-diode switch 316. The mixer 315, when the handset is configured for operation in the cordless receive mode receives a range of frequencies from a quick response synthesizer 317 which provides an output frequency of between 936.755 MHz and 962.755 MHz to generate an IF frequency of 34.755 MHz for cordless operation of the handset. This output frequency is coupled to and filtered in a first cordless intermediate frequency (IF) filter 318. The frequency of the synthesizer 317 is determined by a microprocessor 340 which may be, for example, a microprocessor available from Motorola as Part No. 6805. The IF filter 318 is coupled into the circuit via Schottky diode switches 319 and 320. From the IF filter 318, the signal is coupled to a low noise IF amplifier 321.

From the amplifier 321, the cordless receive signal is coupled to a mixer 322 where it is mixed with a signal from a crystal oscillator 323, which operates at 45.455 MHz. From the mixer 322, a 10.7 MHz signal is generated and is coupled to a second cordless IF filter 324 via a Schottky diode switch 325. This IF filter 324 provides a frequency bandpass at 10.7 MHz. From the IF filter 324, the signal is coupled to a low noise amplifier 327 via Schottky diode switch 326. From the amplifier 327, the signal is coupled via a Schottky diode switch 329 to a third cordless IF filter 328 which also provides a frequency bandpass at 10.7 MHz. From the IF filter 328, the signal is switched via a Schottky diode switch 330 to a low noise amplifier 331.

From the amplifier 331, the signal is coupled to a FM demodulator 332 where the multiple level digital signal is recovered. From the demodulator 332, the signal is coupled to an analog-to-digital (A/D) converter 333 where multiple samples of the digital signal are provided for processing in a baseband circuit 334. The baseband circuit 334 accurately recovers audio signals, provides timing information for the synthesizer 317 and interfaces with the microprocessor 340. From the baseband circuit 334, the signal is provided to a conventional audio interface circuit 335 for providing an audio interface to a user of the portable handset.

Referring next to signal transmission operation of the bimodal portable handset while this handset is configured in the cordless telephone mode, the signal from the audio interface circuit 335 is provided to the baseband circuit 334 and then to a reference synthesizer and FM modulator 336, which may be, for example, a phase-locked-loop. This reference synthesizer and modulator 336 operates at 45 MHz while the handset is configured for operation in the cordless telephone mode. From the modulator 336, the transmit signal is coupled to a mixer 337 where the 45 MHz signal is mixed with a 947 MHz to 973 MHz signal provided by the quick response synthesizer 317 which provides the required frequency hopping by jumping among these frequencies in accordance with a pseudorandom order described in U.S. Pat. No. 5,353,341.

From the mixer 337, a 902 MHz to 928 MHz cordless transmit signal is coupled to an amplifier driver 338 and then to a RF power amplifier 339. From the RF power amplifier 339, the cordless transmit signal is coupled through the pin diode switch 313, which completes a path from the power amplifier 339 to the ISM bandpass filter 311 when the handset is transmitting while configured in the cordless telephone mode. From this filter 311, the cordless transmit signal is coupled through the pin diode switch 312 and onto the antenna 301.

Referring next to the signal reception operation of the bimodal handset while this handset is configured in the cellular telephone mode, a 869 MHz to 894 MHz cellular signal received at the antenna 301 is coupled through the duplexer 351 to a low noise preamplifier 352. From this low-noise preamplifier 352, the cellular receive signal is coupled to the mixer 315 via the pin-diode switch 316. The mixer 315, when the handset is configured for operation in the cellular receive mode, receives a range of frequencies of 914 MHz to 939 MHz from the synthesizer 317 in order to generate an IF frequency of 45 MHz. The IF frequency signal of 45 MHz from the mixer 315 is coupled to and filtered in a first cellular receive IF filter 354. The IF filter 354 is coupled into the circuit via the Schottky diode switches 319 and 320. From the IF filter 354, the signal is coupled to the low noise IF amplifier 321.

From the IF amplifier 321, the cellular receive signal is coupled to the mixer 322 where it is mixed with a signal from the crystal oscillator 323, which operates at 45.455 MHz. At the mixer 322, a cellular receive signal of 455 KHz is generated and coupled to a second cellular IF filter 355 via the Schottky diode switch 325. This second cellular IF filter 355 provides a bandpass at 455 KHz. From the second cellular IF filter 355, the signal is coupled to the low noise amplifier 327 via Schottky diode 326. From the amplifier 327, the signal is coupled via the Schottky diode 329 to a third IF filter 356 which also provides a bandpass at 455 KHz. From the third IF filter 356, the signal is switched via the Schottky diode switch 330 to the low noise amplifier 331.

From the amplifier 331, the signal is coupled to the FM demodulator 332 where the voice signal, the supervisory audio tone (SAT) signal and the wideband data are recovered. From the demodulator 332, the signal is coupled to the A/D converter 333 where the audio signal, the supervisory audio tone (SAT) signal and the wideband data are provided for processing in the baseband circuit 334. The baseband circuit 334 processes the audio signal, accurately recovers the SAT signal, recovers wide band data and interfaces with the microprocessor 340. From the baseband circuit 334, the audio signal is provided to the audio interface circuit 335.

Referring lastly to the signal transmission operation of the bimodal portable handset while this handset is configured in the cellular transmit mode, the signal from the audio interface circuit 335 is provided to the baseband circuit 334 and then to the reference synthesizer and FM modulator 336. In the cellular transmit mode, this synthesizer and FM modulator 336 operates at 90 MHz, for obtaining the cellular transmit signal which includes the modulated audio, SAT and wide band data signals. From the modulator 336, the cellular transmit signal is coupled to the mixer 337 where the 90 MHz signal is mixed with a signal between 914 MHz and 939 MHz from the synthesizer 317. From the mixer 337, the cellular transmit signal of between 824 MHz and 849 MHz is coupled to the amplifier driver 338 for a first level of amplification. From the driver 338, the cellular transmit signal is coupled to the RF power amplifier 339 for a second level of amplification. From the RF-power amplifier 339, the transmit signal is coupled through the duplexer 351 onto the antenna 301.

The control of the bimodal portable handset, in selecting the mode of operation, is determined by a stored program included in the microprocessor 340. Many of the stored programs therein are standard in existing wireless telephones, well known to those skilled in the art and hence are not further discussed herein. The stored programs contributing to the differing operating mode capability are disclosed in the flow diagrams shown in FIGS. 4 to 6. The processes detailed include an initialization procedure after which, depending upon the user selected options, a call may be initiated and received via the frequency hopping system which provides local service or may be initiated and received via the cellular radio system which provides cellular service. Also a standby state in which the handset may monitor both a channel in the frequency hopping system and a channel in the cellular radio system for receipt of a call in either system is facilitated.

The initialization procedure is invoked as soon as power in the bimodal portable handset is turned on, as indicated by step 401. Although the power may be turned on as indicated by step 401, alternatively, the handset may be configured to always be powered on as long as the option for the handset to operate in the frequency hopping system is selected because of the power savings operation available in this mode. The process advances to step 403 and the indicators of the portable handset are turned off. Block 405 reads the selected features and options that are stored in a memory contained in the portable handset. These options and features also may be read from an external memory supplied by a user such as contained within a smart card memory device. A subsequent decision 407 inquires if the local system (i.e. cordless) option has been enabled by the user. An affirmative decision causes the process to proceed to step 409. This step commands the receiver in the portable handset to tune to a predetermined cordless setup channel designated as channel 51, which is a channel selected via a pseudo random process for initiating communications between the cordless base station and the portable handset as described in U.S. Pat. No. 5,343,341.

Figure 5:
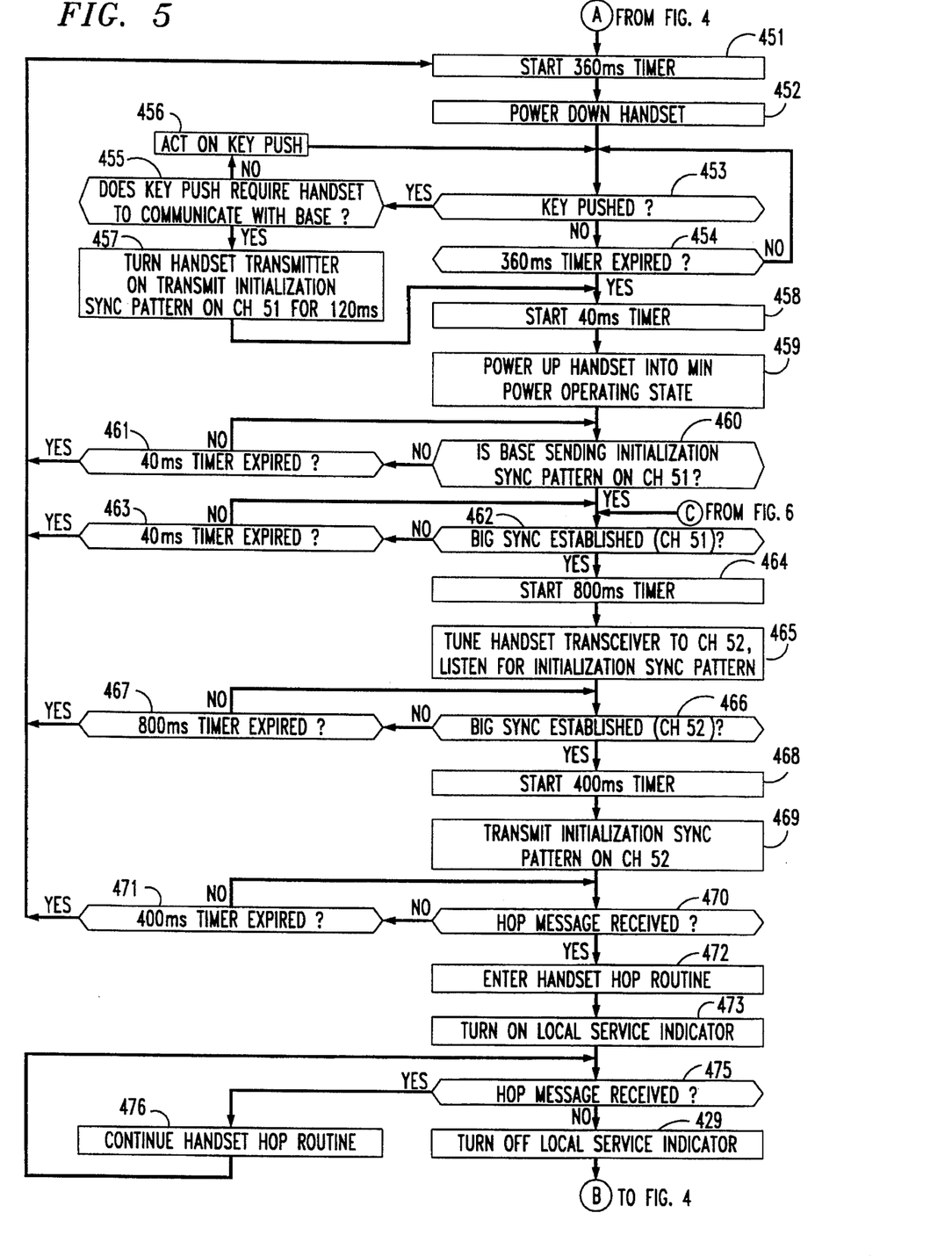

If only the local system (cordless option) is enabled, the handset enters a power cycling routine to conserve battery life by reducing the current drain on the battery. From step 409, the process proceeds to step 451, as shown in FIG. 5, where a wake-up timer, which expires or times-out in 360 milliseconds, is started. The process then advances to step 452 where all other nonessential circuitry in the handset is turned off. The process next advances to decision 453 where a determination is made as to whether a key on the handset keypad has been pushed. If not, the process advances to decision 454 where it determines whether the wake-up timer has expired. If this timer has not expired, the process returns to decision 453 and continues in this loop until either the timer expires or a key is pushed on the handset keypad.

If a key is determined to have been pushed in decision 453, specific circuitry in the handset, which monitors this function, determines in decision 455 whether the key push requires the handset to communicate with the base station. If the key push does not require the handset to communicate with the base station, the circuitry acts on the key push in step 456 and the process returns to decision 453 where it determines once again if a key has been pushed. If at decision 455, however, it is determined that the key push requires the handset to communicate with the base station, the process advances to step 457 where the handset transmitter is turned on and the initialization sync pattern transmitted on channel 51 for 120 milliseconds. The process then advances to step 458 where a 40 millisecond timer is started.

The process similarly advances to this step 458 from decision 454 once it has been determined that the wake-up timer has expired.

From step 458, the process advances to step 459 where the handset is powered up into its minimum power operating state. In this state, the receiver and other minimum circuitry in the handset, necessary for determining if a RF signal is being transmitted by the base station, are turned on. From step 459, the process advances to decision 460 where it is determined whether the base station is sending the initialization sync pattern on channel 51. The initialization sync pattern generally comprises a dotting sequency signal followed by a security code and a barker code. If the base station is not sending the initialization sync pattern, the process advances to decision 461 where it is determined if the 40 millisecond timer has expired. If this timer has expired, the handset has not received the RF signal from the base station and the process returns to the step 451. If the 40 millisecond timer has not expired, the process returns to the decision 460 and continues to look for the sync pattern on channel 51.

If the handset has determined in decision 460 that the base unit is sending the initialization sync pattern on channel 51, then the process advances to decision 462 where a determination is made as to whether the handset has acquired synchronization or "BIG SYNC" on channel 51. BIG SYNC is achieved when a frame position of the handset receiver is aligned with the base unit transmitter. If BIG SYNC has not been achieved, the process advances to decision 463 where it is determined if the 40 millisecond timer has expired. If this timer has expired, the handset has not received BIG SYNC in the allotted time from the base station and the process returns to the step 451, if the 40 millisecond timer has not expired, the process returns to the decision 462 and continues to look for BIG SYNC on channel 51.

Once BIG SYNC is acquired on channel 51, as reflected in decision 462, the process advances to step 464 where an 800 millisecond timer is started. From this step, the process then advances to step 465 where the transceiver, i.e., the transmitter section and the receiver section, is tuned to channel 52 where the receiver begins to listen for the initialization sync pattern. Channel 52, like channel 51, is a predetermined cordless setup channel selected via a pseudorandom process. From decision 465, the process advances to decision 466 where it is determined whether BIG SYNC has been acquired by the handset on channel 52. If not, the process advances to decision 467 where it is determined if the 800 millisecond timer has expired. If this timer has expired, the handset has not acquired BIG SYNC in the allotted time from the base station and the process returns to the step 451. If the 800 millisecond timer has not expired, the process returns to the decision 466 and continues to look for BIG SYNC on channel 52.

If BIG SYNC is acquired on channel 52, the process advances from decision 466 to step 468 where a 400 millisecond timer is started. Next the process advances to step 469 where the transmitter in the handset begins to transmit its initialization sync pattern to the base station on channel 52. The base station will receive this initialization sync pattern from the handset, as earlier described herein with regard to the process in FIG. 3, and send a hop message to the handset.

From the step 469, the process advances to decision 470 where the handset determines whether the hop message has arrived. If not, the process advances to decision 471 where it is determined if the 400 millisecond timer has expired. If this timer has expired, the handset has not received the hop message in the allotted time from the base station and the process returns to the step 451. If the 400 millisecond timer has not expired, the process returns to the decision 470 and continues to look for the hop message. Once the hop message has been received, as reflected in decision 470, the handset begins its countdown sequence to the time at which the frequency hopping sequence is to start. When the countdown sequence ends, the routine for the low power monitoring mode is exited and the process enters the handset hop routine at step 472. From step 472, the local service indicator is turned on indicating that local service has been obtained. As long as hop messages from the base station are received, as in decision 475, the handset continues the hop routine in decision 476. If the hop message is interrupted or the signal from the base station degrades to a level where reception of the hop messages is poor, or intermittent, the local service indicator is turned off at step 429.

To prevent unexpected interruption of local service, the user of the handset is informed by an audible signal when he or she is approaching the outer limit of the operating range of the handset when located remote from the cordless base station. This feature is provided by measuring the accumulated bit errors on certain channels and determining if the received signal strength is above a predetermined acceptable signal quality threshold. From step 429, the process advances to step 431 (FIG. 4) wherein the options set in memory are again read. The process next advances to decision 433 to determine if the cellular operation option has been enabled by the user.

Referring once again to decision 407, a no response to the query of this decision also causes the process to proceed directly to the decision 433. If cellular service has been enabled at this decision, the step 435 performs the conventional cellular setup channel acquisition process. The subsequent decision 437 determines if a cellular set up channel is available. If no cellular set up channel is available the process returns to the step 403. If such a setup channel is available, however, a subsequent decision 439 determines if the system ID is valid in concert with the cellular network. With an invalid ID the process again returns to the step 403. With a valid ID the process proceeds to step 441 which turns on the cellular service indicator and which indicates if the portable handset is in a home or roam mode. The process next advances to step 442 which through its instructions monitors the cellular set up channel.

From step 442, the process advances to decision 443. This decision 443 determines if an incoming call or cellular page message has been received by the portable handset. If a page message has been received then the instructions of step 444 cause a page response to be issued answering the page message received from the cellular base station in accord with conventional cellular standards. The process next advances to decision 445 which determines if a cellular audio channel has been assigned. Once the cellular voice channel has been assigned, the instructions of step 446 set the transceiver, i.e., the transmitter section and receiver of the handset, to the designated cellular audio channel and as per instructions of step 447 the portable handset is thus enabled operative in the cellular system.

While the handset is active in a cellular call state, the decision 448 continually determines if SAT tone is present. If the SAT tone is present, the process returns to step 447 and the cellular call is continued. If the SAT tone is not present, the call is dropped, as per the instructions of decision 449 and the process returns to step 405.

After the initialization procedure is performed in accordance with the processes described in FIG. 4 and FIG. 5, the handset may be configured to a standby state wherein the receiver section monitors both a selected radio frequency channel in the frequency hopping system and a selected one from a group of channels in the cellular radio system. This option is advantageously set in memory in the handset and is selected as an option to perform after the initialization procedure wherein the availability of a cellular setup channel has been determined.

Figure 6:
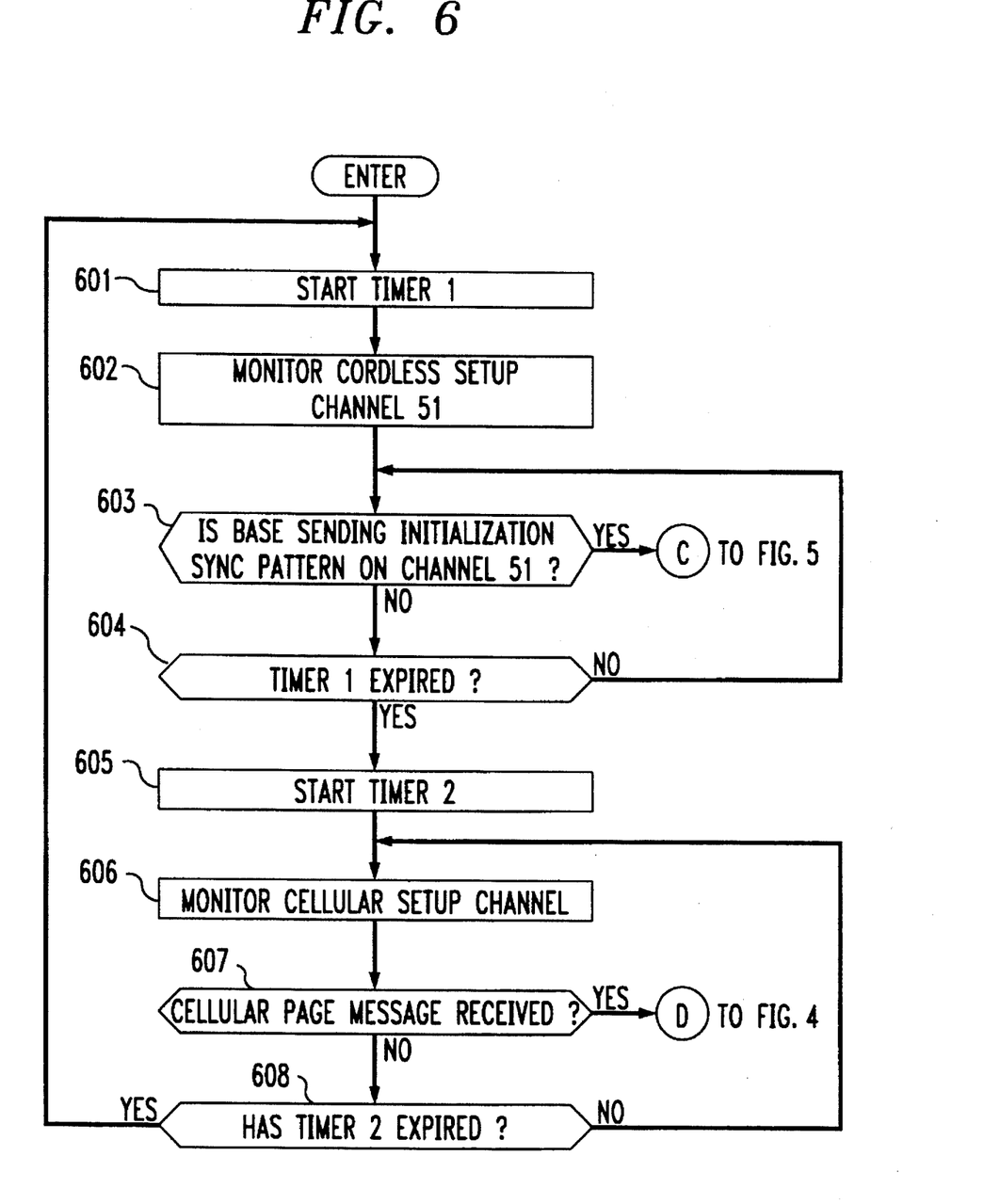

The process is entered at step 601 where a timer 1 is started. From step 601, the process advances to step 602 where the handset receiver is configured to monitor the cordless setup channel 51. From step 602, the process advances to decision 603 which determines if the cordless base station is sending an initialization sync pattern on channel 51. The timer 1 accessed by the process in step 601 has a period of, typically, 50 milliseconds or just long enough to determine if the cordless base station is sending an initialization sync pattern on channel 51 in decision 603. If the sync pattern is being received, the process jumps from decision 603 to the point indicated in the routine shown in FIG. 5 for establishing synchronization with the cordless telephone base station. If the sync pattern is not being received, the process advances to the decision 604 where it is determined if timer 1 has expired. If this timer 1 has not expired, the process returns to decision 603 and again listens for the initialization sync pattern on channel 51.

Once the timer 1 has expired, a timer 2 is started in step 605. This timer 2 has a time period, typically 350 milliseconds, which is much longer than that of timer 1 so that this timer 2 is able to monitor in step 606 all but a small portion of the data stream being generated on the cellular setup channel. That small portion not being monitored is the time period used by timer 1 while the handset determines if it is receiving a cordless telephone call. Thus the time period defined by timer 2 is sufficient to detect if a cellular page message for the handset is being received by decision 607, if not the first time the page message is transmitted, then certainly the second time such message is transmitted. From decision 607, if it is determined that a cellular page message has not been received, then the process advances to the decision 608. If a cellular page message has been received, the process jumps to the point indicted in the routine shown in FIG. 4 for establishing a cellular active call state with a cellular base station.

At decision 608, the process determines if the timer 2 has expired. If not, the process continue to monitor the cellular setup channel. If the timer 2 has expired, the process returns to the step 601 where the timer 1 is again restarted. Thus the handset receiver cycles between the frequency hopping system and the cellular radio system at a rate determined by the timer 1 and the timer 2 while in the standby state awaiting a call in either of these two systems.

Various other modifications of this invention are contemplated and may obviously be resorted to by those skilled in the art without departing from the spirit and scope of the invention as hereinafter defined by the appended claims.

We claim:

1. A portable telephone handset comprising:
    circuit means for communicating with a first base station configured for operation in a frequency hopping system and for communicating with a second base station configured for operation in a cellular radio system, said circuit means including receive signal means for receiving radio-frequency signals from said first base station while configured for operation in said frequency hopping system and from said second base station while configured for operation in said cellular radio system;

control means for selectably configuring said circuit means for operation of the handset in either of said frequency hopping system or said cellular radio system; and;

standby circuit means for configuring said handset to a standby state, while in said standby state the receive signal means also being configured by the standby circuit means for monitoring both a selected radio frequency channel in said frequency hopping system for a first time period for detecting an incoming call directed to the handset from the first base station and a selected one from a group of radio frequency channels in said cellular radio system for a second time period for detecting an incoming call directed to the handset from the second base station, while in said standby state the receive signal means cycling between said first and second time period, and wherein said second time period is greater than said first time period.

2. The portable telephone handset as in claim 1 wherein the circuit means includes baseband circuitry for processing received radiotelephone signals and signals generated by a user of the handset.

3. The portable telephone handset as in claim 1 wherein the circuit means includes radio-frequency circuit means for commonly generating signals in the handset both for transmission to said first base station operating in said frequency hopping system and for transmission to said second base station operating in said cellular radio system.

4. The portable telephone handset as in claim 3 wherein the radio-frequency circuit means includes a first synthesizer for providing a selected frequency for use in determining the frequency of a radio-frequency signal for transmission by the handset.

5. The portable telephone handset as in claim 4 wherein the control means includes means for configuring said first synthesizer for providing the selected frequency from a range of selected frequencies for use in operating in said frequency hopping system and said cellular radio system.

6. The portable telephone handset as in claim 4 wherein the radio-frequency circuit means includes a second synthesizer for providing a reference frequency for use in determining the frequency of the radio-frequency signal for transmission by the handset.

7. The portable telephone handset as in claim 6 wherein the radio-frequency circuit means further includes a mixer for combining the selected frequency and the reference frequency for generating the radio-frequency signal for transmission by the handset.

8. The portable telephone handset as in claim 7 wherein the radio-frequency circuit means includes amplifying means for amplifying both radio-frequency signals generated for transmission to said first base station configured for operation in said frequency hopping system and to said second base station configured for operation in said cellular radio system.

9. The portable telephone handset as in claim 1 wherein the receive signal means includes an antenna for transmitting and receiving signals between said handset and said first and second base stations.

10. The portable telephone handset as in claim 1 wherein the receive signal means includes first radio-frequency circuit means for receiving the radio-frequency signals from said first base station and second radio-frequency circuit means for receiving the radio-frequency signals from said second base station.

11. The portable telephone handset as in claim 10 wherein the receive signal means further includes switching means operably responsive to said control means for interconnecting commonly shared multiple amplifier means to the first radio-frequency circuit means when the handset is configured for operation in said frequency hopping system and to the second radio-frequency circuit means when the handset is configured for operation in said cellular radio system.

12. The portable telephone handset as in claim 11 wherein said control means comprises processor means.

13. The portable telephone handset as in claim 11 further comprising means for initializing the handset for operation with one of the first or second base stations.

14. The portable telephone handset as in claim 13 further comprising means for originating calls from the handset to one of the first or second base stations.

15. The potable telephone handset as in claim 14 wherein the call originating means includes means for connecting said handset and said first base unit for exchanging radio signals when said handset is within reception range of the first base unit, said connecting means connecting said handset to said second base unit when said handset is outside of the reception range of said first base unit.

16. The portable telephone handset as in claim 14 further comprising means for receiving calls from one of the first or second base stations.

17. The portable telephone handset as in claim 1 further comprising:

multiple amplifier means for amplifying both the signals received from the first base station and the signals received from the second base station; and switching means operably responsive to the control means for interconnecting the multiple amplifier means to the first receiving means for receiving signals from the first base station and to the second receiving means for receiving signals from the second base station.

18. The portable telephone handset as in claim 17 further including an antenna for receiving signals from said first and second base stations.

19. The portable telephone handset as in claim 1 further including receive signal selection means for configuring said receive signal means to monitor only the selected radio frequency channel in said frequency hopping system, said selection means including power cycling means for cycling operating power for said receive signal means between a power-on state and a power-off state while the handset is in said standby state.

20. The portable telephone handset as in claim 19 wherein said receive signal selection means configures a transmitter in said handset in a deactivated state while the handset is in said standby state, said transmitter being used by said handset for communications with said first base station.

21. The portable telephone handset as in claim 20 wherein in response to user initiated communications at said first base station, said power cycling means is inhibited from cycling operating power to said receive signal means and said receive signal means is configured in the power-on state.

22. The portable telephone handset as in claim 21 wherein in response to said user initiated communications at said first base station, said transmitter changes from the deactivated state to a full-on operating state.

23. A method of selectively operating a portable telephone handset, the method comprising the steps of:

communicating with a first base station configured for operation in a frequency hopping system;

receiving radio-frequency signals from said first base station while said handset is configured for operation in said frequency hopping system;

communicating with a second base station configured for operation in a cellular radio system;

receiving radio-frequency signals from said second base station while said handset is configured for operation in said cellular radio system;

configuring the handset selectably for operation in either of said frequency hopping system or said cellular radio system;

configuring the handset to a standby state and monitoring while in said stand by state both a selected radio frequency channel in said frequency hopping system for a first time period for detecting an incoming call on said frequency hopping system directed to the handset and monitoring a selected radio frequency channel from a group of frequency channels in said cellular radio system for a second time period for detecting an incoming call on said cellular radio system directed to the handset, said second time period being greater than said first time period; and cycling between said first and second time period while the handset is in the standby state.

24. The method of selectively operating a portable telephone handset as in claim 23 further including the steps of receiving in a first radio-frequency circuit the radio-frequency signals from said first base station and receiving in a second radio-frequency circuit the radio-frequency signals from said second base station.

25. The method of selectively operating a portable telephone handset as in claim 24 further including the step of interconnecting commonly shared multiple amplifiers to the first radio-frequency circuit when the handset is configured for operation in said frequency hopping system and to the second radio-frequency circuit when the handset is configured for operation in said cellular radio system.

26. The method of selectively operating a portable telephone handset as in claim 23, the method further comprising the steps of:

amplifying both the signals received from the first base station and the signals received from the second base station with common multiple amplifiers; and interconnecting the multiple amplifiers to the first radio-frequency circuit for amplifying signals received from the first base station and to the second radio-frequency circuit for amplifying signals received from the second base station.

27. The method of selectively operating a portable telephone handset as in claim 23 further including the step of selecting for monitoring in a receiver in said handset only the selected radio frequency channel in said frequency hopping system, said selecting step including the step of cycling operating power for the receiver between a power-on state and a power-off state while the handset is in said standby state.

28. The method of selectively operating a portable telephone handset as in claim 27 wherein said selecting step configures a transmitter in said handset in a deactivated state while the handset is in said standby state, said transmitter being used by said handset for communications with said first base station.

29. The method of selectively operating a portable telephone handset as in claim 28 wherein in response to user initiated communications at said first base station, said operating power cycling step is inhibited from cycling operating power to said receive signal means and said receiver is configured in the power-on state.

30. The method of selectively operating a portable telephone handset as in claim 29 wherein in response to said user initiated communications at said first base station, said transmitter changes from the deactivated state to a full-on operating state.

* * * * *